United States Patent [19]

Vreugde

[11] Patent Number: 5,670,193

[45] Date of Patent: Sep. 23, 1997

[54] SAUERKRAUT IN SINGLE-SERVING PACKAGE AND PROCESSING METHOD

[75] Inventor: Charles Vreugde, East Farmingdale, N.Y.

[73] Assignee: Chasu Foods Inc., East Farmingdale, N.Y.

[21] Appl. No.: 565,979

[22] Filed: Dec. 1, 1995

[51] Int. Cl.[6] .......................... A23L 1/218; B65B 29/00; B65B 25/04

[52] U.S. Cl. .................. 426/106; 426/615; 426/410; 426/413; 426/326; 426/102; 426/123

[58] Field of Search .................... 426/8, 49, 106, 426/99, 102, 392, 397, 615, 410, 413, 326, 123

[56] References Cited

U.S. PATENT DOCUMENTS

| | | | |
|---|---|---|---|
| 2,542,206 | 2/1951 | Nichols | 426/410 |
| 2,756,154 | 7/1956 | Mahaffy | 426/106 |
| 3,798,338 | 3/1974 | Galle | 426/99 |
| 4,696,824 | 9/1987 | Meczkowski | 426/102 |
| 4,946,694 | 8/1990 | Gunnerson et al. | 426/102 |

FOREIGN PATENT DOCUMENTS

| | | | |
|---|---|---|---|
| 1517046 | of 1970 | Germany | 426/412 |
| 4236168 | 4/1994 | Germany | 426/615 |

OTHER PUBLICATIONS

Preservatives Order, No. 491/1994, Para. 1(2) and Annex 2 Para. 96. (Dialog Abstract).

Die Industrielle Obst. und Gemuseverwertung V. 67(3), Feb. 4, 1982 pp. 51–55 (Dialog Abstract).

Food Processing 1974, 35(6) 40–41 (Dialog Abstract).

Nauchni Trudove . . . 1975, 12, 107–119.

Columbus Dispatch Apr. 29, 1992 Sec: Food Page: 2F (Dialog).

Arizone Republic/Phoenix Gazette Jul. 26, 1989 Section: Food. p. FD1 (Dialog.).

Star Tribune Jul. 26, 1989 Sec: Taste, p. 04F (Dialog).

Witchita Eagle Jul. 22, 1992 Sec: Daybreak p. 3C. (Dialog).

*Primary Examiner*—Steven Weinstein
*Attorney, Agent, or Firm*—Charles E. Baxley, Esq.

[57] ABSTRACT

Sauerkraut is mixed with a predetermined quantity of edible vegetable oil to improve the flow properties of the sauerkraut during packaging in single use film type packages. The vegetable oil also facilitates the removal of the sauerkraut from the package. A method is also provided for flavoring the sauerkraut before it is packaged in single use packages.

12 Claims, 2 Drawing Sheets

SAUERKRAUT IN SINGLE-SERVING PACKAGE AND PROCESSING METHOD

BACKGROUND OF INVENTION

The present invention relates generally to sauerkraut in a single use package and methods for processing same.

Traditionally, loose sauerkraut has been dispensed by vendors from portable dispensers at various locations such as street corners, ball parks, stadiums, arenas and racetracks in conjunction with sale of hot dogs. Health concerns now make it impractical for such vendors to serve loose sauerkraut. Prior art attempts which rely on the addition of brine to the sauerkraut result in an unacceptable package as a result of the unwanted spilling of the brine onto the hot dog or other food when the package is torn open. Another prior art attempt to provide sauerkraut in small packages is described in German Patent No. 1,517,046 which teaches placing sauerkraut in foil packages (weighing 400 to 500 milliliteres or approximately one pound and then subjecting the foil packages to a pasteurization process at 70° to 75° Celsius, approximately 165° Fahrenheit, for about twenty minutes. This heating process releases fluid from the sauerkraut and changes the texture of the sauerkraut to an unappealing soft and mushy consistency. German Patent 1,517,046 does not teach product removal by means of pressure from a flexible portion controlled packet. Recent rises in food borne illnesses militate against the serving of loose sauerkraut.

Accordingly there is a need for packaging sauerkraut or similar fibrous condiments in single use packages. The fibrous texture of sauerkraut makes it difficult for sauerkraut to flow smoothly through conventional food packaging machinery and previous attempts to provide single use packages have not been successful. Prior art attempts to improve the flow of sauerkraut through various types of processing machinery have relied on increase of its salt water or brine component.

OBJECTS AND SUMMARY OF INVENTION

It is an object of the present invention to provide sauerkraut in a single use package which eliminates the machinery clogging problems previously encountered.

Another object of the present invention is to provide sauerkraut in a single use package which can be easily filled by food packaging machinery.

Another object of the present invention is to provide sauerkraut in a single use package which reduces the amount of salt water or brine needed to promote flow of the sauerkraut during processing.

Another object of the present invention is to provide sauerkraut in a single use package which can be easily opened by a user.

Another object of the present invention is to provide a method for processing sauerkraut.

Another object of the present invention is to provide sauerkraut in a single use package in which edible vegetable oil is used to facilitate the flow of the sauerkraut out of the package when the sauerkraut is dispensed.

Yet another object of the present invention is to provide sauerkraut in a single use package which can be processed by specifically designed food machinery in an efficient manner.

The foregoing and other objects and advantages of the present invention will appear more clearly hereinafter.

In accordance with the present invention there is provided sauerkraut in a single use package which incorporates a predetermined quantity of edible vegetable oil to facilitate flow of the sauerkraut through food processing machinery.

In the primary embodiment of the invention, sauerkraut is mixed with predetermined quantities of vegetable oil, ascorbic acid, citric acid and potassium sorbate.

In a second preferred embodiment of the present invention the following additional ingredients are added to the ingredients of the first embodiment in order to provide a hot and spicy flavor: tomato sauce, cayenne pepper, minced onions, salt and ground pepper.

The present invention also provides a method for processing sauerkraut prior to placing the sauerkraut in single use packages.

BRIEF DESCRIPTION OF THE DRAWINGS

Other important objects and advantages of the present invention will be apparent from the following detailed description of the invention, taken in conjunction with accompanying drawings in which.

DETAILED DESCRIPTION OF THE INVENTION

Figure 1:
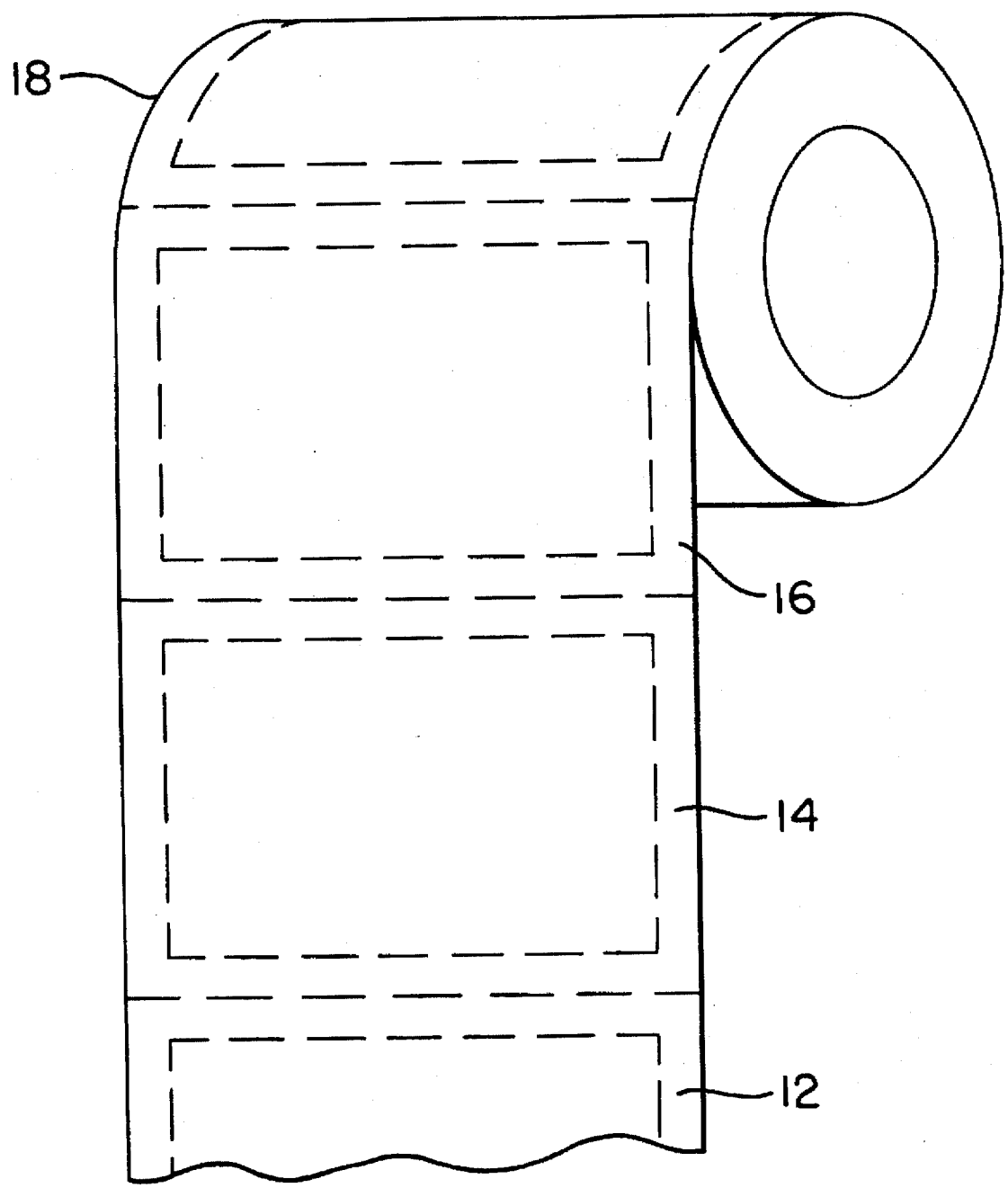
FIG. 1 is an overall perspective view of roll of stock suitable for being formed into single use packages according to the present invention.

With reference to the drawings, wherein like reference numbers designate like or corresponding parts throughout, there is shown in FIGS. 1–4 a single use package generally designated 10 which is filled with sauerkraut in accordance with the present invention. FIG. 1 shows roll stock suitable for being formed by bagging machinery into a plurality of single use packages or packets 12, 14, 16 which are joined to form a roll 18 for use with a suitably adapted vertical feed filling machine. Each packet 12, 14, 16 preferably will contain in the order of one and one-half (1½) ounces of a sauerkraut in accordance with the present invention which will be presently described in detail.

Figure 2:
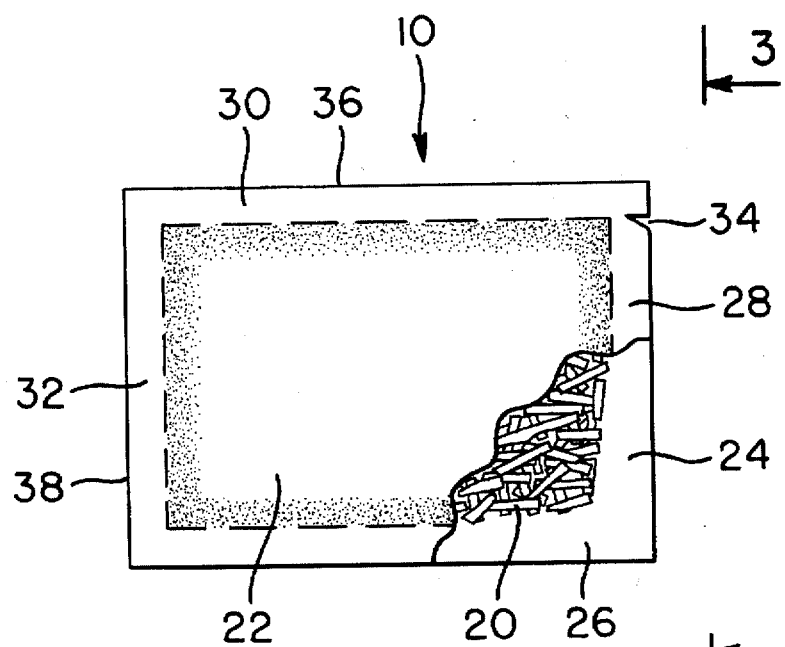
FIG. 2 is a top view of a single use package filled with sauerkraut, according to the present invention.

FIG. 2 shows an individual packet generally designated 10 which has been filled with sauerkraut 20 according to the present invention with the sauerkraut 20 having a formulation which presently will be described.

Figure 3:
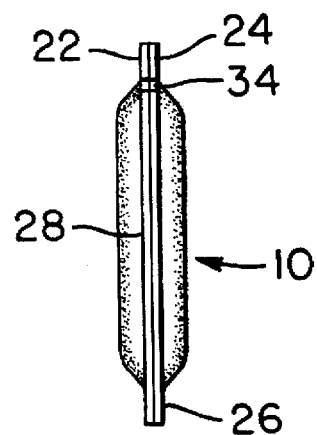
FIG. 3 is a side view of the single use package taken along line 3—3 of FIG. 2.
Figure 4:
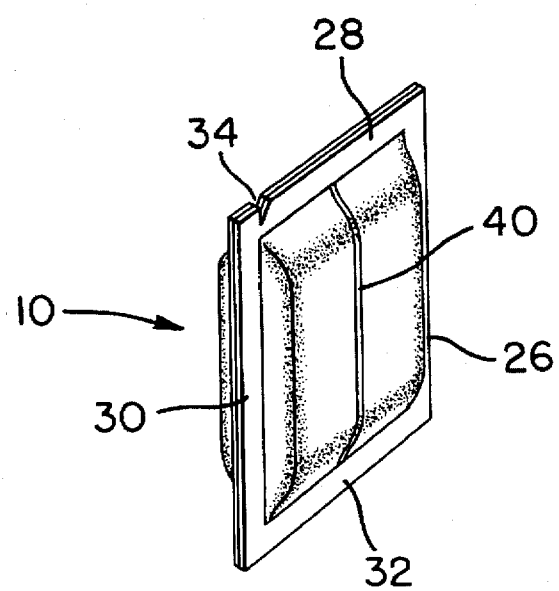
FIG. 4 is an isometric view of the single use package.

As is best shown in FIGS. 2–4, the packet 10 includes a pair of rectangular panels 22, 24. Panels 22, 24 are joined along their borders 26, 28, 30, 32 by one of a number of known sealing means, preferably heat sealing, although an adhesive or crimping to form the packet 10 might alternately be employed. The panels 22, 24 may be made of one of a number of food compatible, flexible film materials such as poly-nylon. A tear notch 34 is located in the edge 36 to facilitate opening the packet 10. Forming the packets 10, as shown in FIG. 4, provided with seals 40 facilitates filling of the sauerkraut 20 thereon.

The preferred dimensions for a one and one-half (1½) ounce single serving portion are 4 inches in length, as measured along the edge 36 and 2¾ inches in width as measured along the edge 38. The borders 26, 28, 30, 32 each have a width in the order of three eighths of an inch.

The dimensions of the packet 10, the material of the panels 22, 24 as well as the one and one-half ounce portion size are presented herein for purposes of illustration only and should not be considered as a limitation in any way on the present invention. The material of the panels 22, 24 as well as the size of the panels 22, 24 may be varied, as desired, to provide a range of sauerkraut portion sizes.

The sauerkraut 20 is prepared using the following processes which describe preparation of both plain sauerkraut and hot and spicy flavored sauerkraut known as "Cajun Sauerkraut".

Plain sauerkraut is prepared according to the following process:

| STEP | PROCESS |
| --- | --- |
| 1 | Drain a two pound bag of commercially available sauerkraut, preferably Grade A sauerkraut. |
| 2 | Set the drained sauerkraut aside in a mixing bowl. |
| 3 | In a separate container pour one ounce of vegetable oil, preferably natural butter flavor. |
| 4 | Add the following to the vegetable oil of Step 3: One teaspoon of ascorbic acid, One teaspoon of citric acid, and One-half teaspoon of potassium sorbate. |
| 5 | Combine the mixture of Step 4 with the sauerkraut of Step 2 and mix. |
| 6 | Fill the packets 12, 14, 16 with the mixture of Step 5 and seal the packets. |

Hot and spicy flavor sauerkraut is prepared according to the following process:

| STEP | PROCESS |
| --- | --- |
| 1 | Drain a two pound bag of commercially available sauerkraut, preferably Grade A sauerkraut. |
| 2 | Set the drained sauerkraut aside in a mixing bowl. |
| 3 | In a separate container pour one ounce of vegetable oil, preferably natural butter flavor. |
| 4 | Add the following to the vegetable oil of Step 3: One teaspoon of ascorbic acid, One teaspoon of citric acid, and One-half teaspoon of potassium sorbate. |
| 5 | Add the following to the mixture of Step 4: Eight ounces of Italian style tomato sauce, One-half ounce of cayenne pepper, Two ounces of minced onions, One-half teaspoon of salt, and One-half teaspoon of ground pepper - and mix. |
| 6 | Combine the mixture of Step 5 with the sauerkraut and mix. |
| 7 | Fill the packets 12, 14, 16 with the mixture of step 6 and seal top 30 and bottom 26 borders of the packets. |

In the foregoing described processes, each of the ingredients is commercially available and no specific brand name product is required. The proportions of the above ingredients have been based on the preparation of approximately two pounds of sauerkraut. This amount has been selected by way of example and it is understood that the quantities of the various ingredients may be increased or decreased proportionately to facilitate preparation of larger or smaller amounts of sauerkraut.

The addition of the vegetable oil serves the dual purpose of eliminating the clogging of the machinery used to fill the packets 12, 14, 16 thereby eliminating the need for large amounts of salt water or brine to assist the flow of the sauerkraut 20 in the machinery. The addition of the vegetable oil also allows the sauerkraut to be squeezed easily and quickly out of the packets 12, 14, 16 thereby facilitating the convenient use of this product.

While the present invention has been described in connection with the preparation of sauerkraut, it is clear that this invention also is applicable to other similar fibrous condiments.

The foregoing specific embodiments of the present invention as set forth in the specification herein are for illustrative purposes only. Various deviations and modifications may be made within the spirit and scope of this invention, without departing from the main theme thereof.

I claim:

1. A single-serving package of sauerkraut comprising:
   a pair of flexible panel members each having marginal portions;
   fastening means joining said marginal portions of said pair of panel members thereby forming a sealed hollow package;
   a preselected quantity of brine-free sauerkraut disposed in said sealed package; and
   a preselected quantity of vegetable oil mixed with said sauerkraut and disposed in said sealed package, said vegetable oil being present in the package in an amount sufficient to both eliminate the clogging of the machinery used to fill the package and to allow the sauerkraut to be squeezed easily and quickly out of the package after the package is opened.

2. The single-serving package according to claim 1 in which said preferred quantity of sauerkraut is in the order of one and one-half ounces.

3. The single-serving package according to claim 1 in which said vegetable oil is mixed with said sauerkraut in the preferred proportions Of one ounce of vegetable oil to approximately two pounds of sauerkraut.

4. The single-serving package according to claim 1 in which said sauerkraut comprises Grade A sauerkraut.

5. The single-serving package according to claim 1 in which said vegetable oil comprises natural butter flavored vegetable oil.

6. The single-serving package according to claim 1 in which said pair of panel members comprise rectangular panel members.

7. The serving-serving package according to claim 1 in which said pair of panel members each comprise a film material.

8. The single-serving package according to claim 1, further comprising:
   one teaspoon of ascorbic acid,
   one teaspoon of citric acid, and
   one-half teaspoon of potassium sorbate,
   with said ascorbic acid, said citric acid and said potassium sorbate mixed with said sauerkraut.

9. The single-serving package according to claim 1, further comprising:
   ascorbic acid,
   citric acid,
   potassium sorbate,
   tomato sauce,
   cayenne pepper,
   minced onions,
   salt, and
   ground pepper.

10. The single-serving package according to claim 1 in which the following are mixed with approximately two pounds of sauerkraut:
    one ounce of vegetable oil, one teaspoon of ascorbic acid, one teaspoon of citric acid, one-half teaspoon of potassium sorbate, eight ounces of tomato sauce, one-half ounce of cayenne pepper, two ounces of minced onions, one-half teaspoon of salt, and one-half teaspoon of ground pepper.

11. A method for providing sauerkraut in a single serving package comprising the steps of:

draining a quantity of two pounds of sauerkraut, placing said drained sauerkraut in a first mixing container, placing the following into a second mixing container:
   One ounce of vegetable oil,
   One teaspoon of ascorbic acid,
   one teaspoon of citric acid, and
   One-half teaspoon of potassium sorbate, mixing the contents of said second mixing container, placing the contents of said second mixing container in said first mixing container, and open mixing both said drained sauerkraut and the contents of said second container in said first mixing container, preparing a plurality of hollow film packages, placing a preselected quantity of the mixed sauerkraut and the contents of said second mixing container in each of said plurality of hollow film packages without the addition of brine, and sealing each of said hollow film packages, said vegetable oil present in each of the packages in an amount sufficient to both eliminate the clogging of the machinery used to fill the packages and to allow the sauerkraut to be squeezed easily and quickly out of each of the packages after that package is opened.

12. A method for providing sauerkraut in a single-serving package according to claim 11, following said step of placing said vegetable oil, said abscorbic acid, said citric acid and said potassium sorbate in said second mixing container, further comprising the step of:

placing the following in said second mixing container:
   8 ounces of tomato sauce,
   one-half ounce of cayenne pepper,
   two ounces of minced onions,
   one-half teaspoon of salt, and
   one-half teaspoon of ground pepper, so that the sauce, pepper, onions, salt and pepper will be mixed with said vegetable oil, ascorbic acid, citric acid and potassium sorbate.

* * * * *